United States Patent [19]

Kouno et al.

[11] Patent Number: 5,375,479
[45] Date of Patent: Dec. 27, 1994

[54] SERIES AND A SERIES-GROUP OF ORTHOGONAL GEAR REDUCERS WITH MOTORS

[75] Inventors: Isao Kouno, Nagoya; Mitsuo Ogamoto; Tetsushi Isozaki, both of Ohbu; Kiyoji Minegishi, Aichi; Katsumi Taki, Inazawa, all of Japan

[73] Assignee: Sumitomo Heavy Industries, Ltd., Tokyo, Japan

[21] Appl. No.: 22,040

[22] Filed: Feb. 24, 1993

[30] Foreign Application Priority Data

Feb. 25, 1992 [JP] Japan .................... 4-073356

[51] Int. Cl.$^5$ ............ F16H 1/14; F16H 57/02
[52] U.S. Cl. .................. 74/420; 74/421 A; 74/423; 74/606 R; 310/83
[58] Field of Search ........ 74/423, 420, 421 A, 74/606 R; 310/83, 99

[56] References Cited

U.S. PATENT DOCUMENTS

| | | | |
|---|---|---|---|
| 2,012,266 | 8/1935 | Bailey et al. | 74/420 X |
| 2,810,305 | 10/1957 | Brinza et al. | 74/423 X |
| 3,143,897 | 8/1964 | Kohn | 74/606 |
| 3,434,366 | 3/1969 | Raso et al. | 74/421 A |
| 3,603,162 | 9/1971 | Gohler | 74/606 R X |
| 3,892,986 | 7/1975 | Allen | 310/42 |
| 4,811,616 | 3/1989 | Henderson | 74/421 A |

FOREIGN PATENT DOCUMENTS

| | | |
|---|---|---|
| 207645 | 2/1960 | Austria . |
| 0177001 | 4/1986 | European Pat. Off. . |
| 1-126468 | 5/1989 | Japan . |
| 1-141251 | 6/1989 | Japan . |

WO82/01050 4/1982 WIPO .

OTHER PUBLICATIONS

Patent Abstracts of Japan, vol. 13, No. 398, Sep. 5, 1989.

Primary Examiner—Allan D. Herrmann
Attorney, Agent, or Firm—Nikaido Marmelstein Murray & Oram

[57] ABSTRACT

Disclosed is a series and a series group of orthogonal gear reducers with motors. A motor cover is disposed separately from a gear box. In each of sub-series (frame number) wherein the gear boxes have the same fitting dimensions (sizes) to be mounted to a mating machines, the following requirements are satisfied: (1) The fitting dimension between the motor cover and the gear box is made constant; (2) An axial shifted amount between a hypoid pinion and a hypoid gear is made constant; (3) an outside diameter of the hypoid gear is made almost constant; and (4) a distance between the center of the hypoid gear, and the mounting surface for the motor cover and the gear box is made constant. Thus, it is possible to keep the required strength level of the hypoid gear set to be almost constant and to combine two kinds or more of the motors to one of the gear box by combining the hypoid pinion constituting the hypoid gear set having a low reduction ratio with a large capacity motor, and also combining the hypoid pinion constituting the hypoid gear set having a high reduction ratio to a small capacity motor. With this construction, it is possible to increase the parts for common use as much as possible while securing various combinations of motor capacities and reduction ratios, and hence to meet the requirements of users with cost reduction.

4 Claims, 14 Drawing Sheets

FIG. 1

| | | 1 | 2 | 3 | ~ | N-1 | N |
|---|---|---|---|---|---|---|---|
| | REDUCTION RATIO | LOW | ← | | | → | HIGH |
| | MOTOR CAPACITY | LARGE | ← | | | → | SMALL |
| (1) | (FITTING DIMENSION BETWEEN MOTOR COVER AND GEAR BOX) | CONSTANT : f1(a) ||||||
| (2) | (AXIAL SHIFTED AMOUNT OF HYPOID GEAR) | CONSTANT : f2(a) ||||||
| (3) | (OUTSIDE DIAMETER OF HYPOID GEAR) | ALMOST CONSTANT : f3(a) ||||||
| (4) | (DISTANCE BETWEEN THE CENTER OF HYPOID GEAR AND MOUNTING SURFACE) | CONSTANT : f4(a) ||||||

FRAME NUMBER A (SUB-SERIES A)
(MOUNTING SIZE TO THE MATING MACHINE : a)

| | | 1 | 2 | 3 | ~ | N-1 | N |
|---|---|---|---|---|---|---|---|
| | REDUCTION RATIO | LOW | ← | | | → | HIGH |
| | MOTOR CAPACITY | LARGE | ← | | | → | SMALL |
| (1) | (FITTING DIMENSION BETWEEN MOTOR COVER AND GEAR BOX) | CONSTANT : f1(b) ||||||
| (2) | (AXIAL SHIFTED AMOUNT OF HYPOID GEAR) | CONSTANT : f2(b) ||||||
| (3) | (OUTSIDE DIAMETER OF HYPOID GEAR) | ALMOST CONSTANT : f3(b) ||||||
| (4) | (DISTANCE BETWEEN THE CENTER OF HYPOID GEAR AND MOUNTING SURFACE) | CONSTANT : f4(b) ||||||

FRAME NUMBER B (SUB-SERIES B)
(MOUNTING SIZE TO THE MATING MACHINE : b)

FRAME NUMBER C (SUB-SERIES C)
(MOUNTING SIZE TO THE MATING MACHINE : c)

- - -

SERIES OF ORTHOGONAL GEAR REDUCERS WITH MOTORS

PRIOR ART

FIG. 15

PRIOR ART

SERIES AND A SERIES-GROUP OF ORTHOGONAL GEAR REDUCERS WITH MOTORS

BACKGROUND OF THE INVENTION

1. Field of the Invention

The present invention relates to a series (and a series group) of orthogonal gear reducers with motors capable of securing a large number of combinations between the required load capacities and reduction ratios while lessening the kinds of the motors and gear boxes to be prepared. The present invention may be embodied in the applications of physical distribution equipments, particularly, conveyors or the like.

2. Description of the Prior Art

Recently, in the market of physical distribution equipments, particularly, conveyors or the like, there has been an enhanced need for orthogonal gear reducers with motors, each of which includes a motor and makes the output shaft orthogonal to the motor shaft.

The reason why the reducer mounted with a motor is required is as follows:

Namely, for example, in the physical distribution system which constituted of a plurality of conveyors, efficiency is increased by only operating the required parts are operated when. In this case, it is desirable to independently drive the conveyors. Also, in changing the arrangement of the individual conveyors, which is often carried out for modifying the conveying path, it is advantageous to independently drive the conveyors.

On the other hand, the reason why the orthogonal gear reducer is required is as follows:

Namely, the orthogonal gear reducer with a motor generally has the maximum dimension (longitudinal dimension) in the direction of the motor shaft. Accordingly, for enhancing the space performance in mounting the gear reducer, the gear reducer is desired to be disposed in such a manner that the direction of its maximum dimension (the direction of the motor shaft) is parallel to the conveyor. On the contrary, for driving the shaft of the conveyor, the output shaft of the gear reducer must be paralleled to the shaft of the conveyor. Consequently, the output shaft of the gear reducer must be disposed orthogonally to the motor shaft.

The present applicant has been proposed such an orthogonal gear reducer with a motor as satisfying the above requirement in Japanese Patent Laid-open No. sho 62-283044 (Japanese Patent Publication No. hei 2-53656) which is Japanese Patent Laid Open No. 1-126468, and put it on the market. The known example is shown in FIGS. 14 and 15.

The orthogonal gear reducer with a motor of the known example includes a hypoid gear set 20 at a first step, and the combination of parallel shaft gears 21 at a second step or more. Thus, by changing the combination of the parallel shaft gears 21, the reduction ratio can be changed.

Therefore, in order to meet the various requirements of users, a plural of "sub-series" (hereinafter, referred to as "frame number") are previously prepared. Namely, the fitting dimensions (mounting sizes) to the mating machine determined by the size of the output shafts and the gear boxes are classified into several kinds (from "small" to "large") to define several kinds of frame numbers, in accordance with the market requirement. Further, in the same frame number, several kinds of reduction ratios are previously systematized. Thus, by preparing a series constituted of the above frame numbers, it is possible to meet the various requirements of users.

Figure 14:
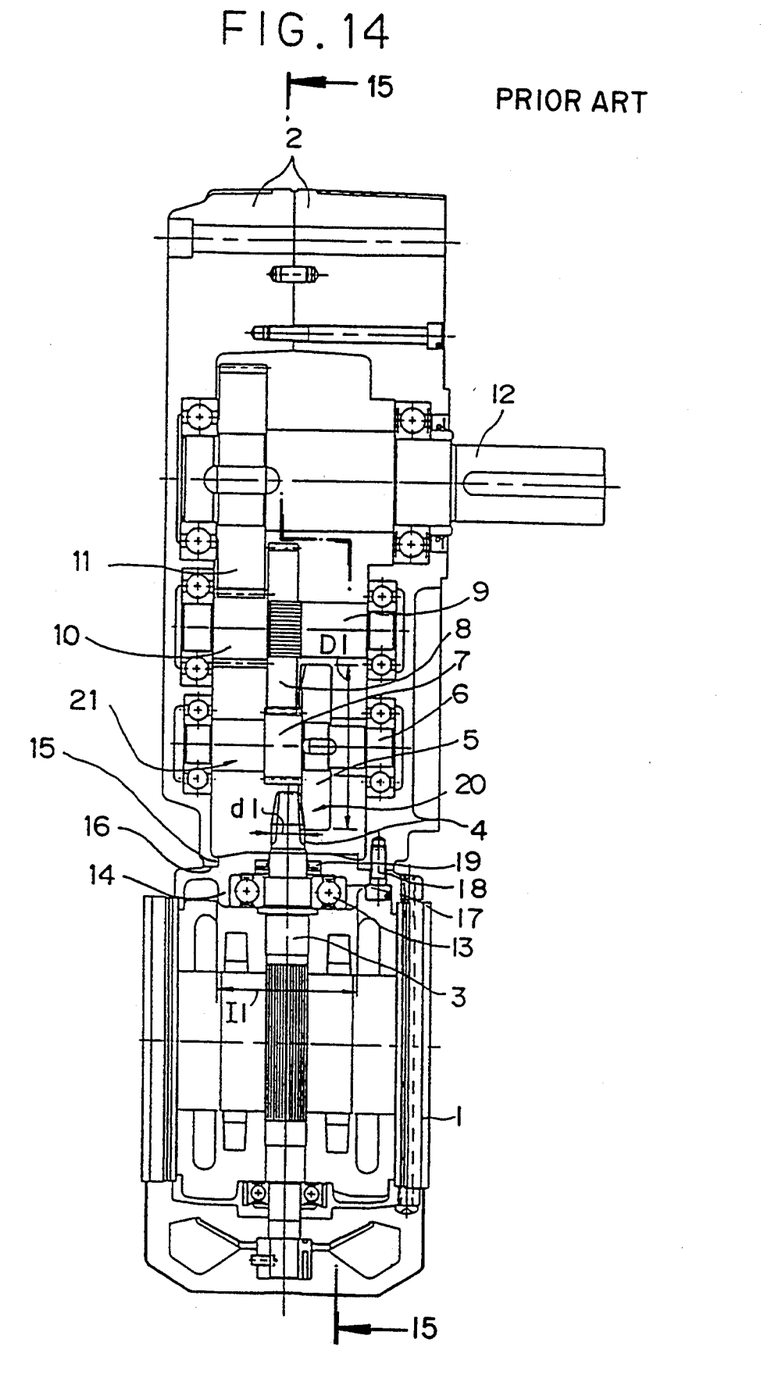
FIG. 14 is a development of a gear train in an embodiment, wherein a small capacity motor is combined with a high reduction ratio gear box (the reducer itself known)
Figure 15:
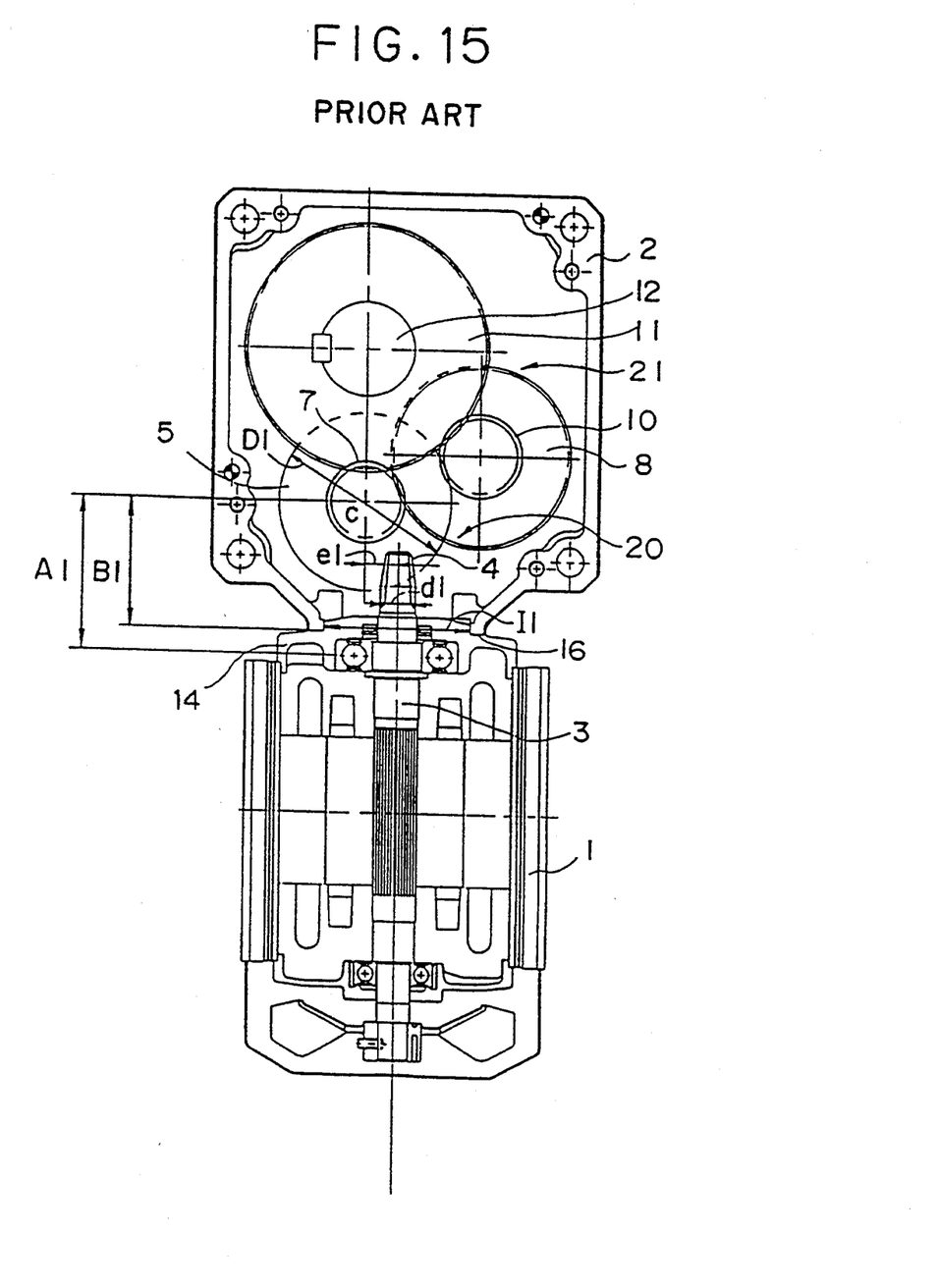
FIG. 15 is an axial sectional view showing the arrangement of the gear train of FIG. 14.

However, the series of the known example shown in FIGS. 14 and 15 has the following inconvenience: Namely, in the series, one motor 1 is prepared in one frame number, and a special gear box 2 is prepared for each reduction ratio required in the same frame number, and accordingly, in the actual circumstances, the number of the parts for common use is very small as the whole series.

To increase the number of parts for common use as large as possible, there has been proposed such a series as shown in FIGS. 16 to 19.

Namely, in general, the gear reducer, which includes the orthogonal gear reducer with a motor, is used in order to reduce the rotation of the motor to be the optimal rotational speed required for the mating driven machine. When the sizes of the output shaft and the gear box of the reducer are determined by the frame number, the limit of the mechanical strength (allowable output torque) is approximately determined. Consequently, even in the same frame number, the following combination is preferable for the strength balance between the output shaft and the reduction ratio: a large capacity motor is combined with a gear box of a low reduction ratio (the rotational ratio between the motor and the output shaft is small), while a small capacity motor is combined with a gear box of a high reduction ratio (the rotational ratio between the motor and the output shaft is small).

Accordingly, for light weight and compactness, it is preferable to perform the serialization by combining motors having two kinds or more of the capacities in one frame number.

On the other hand, as shown in FIGS. 14 and 15, in the orthogonal gear reducer with a motor using a hypoid gear set 20, for achieving the compactness as a whole, a hypoid pinion 4 is generally formed integrally with a motor shaft 3.

In the hypoid gear set 20, an outside diameter d1 of a hypoid pinion 4 and an outside diameter D1 of a hypoid gear 5 are determined depending on the transmission amount and the reduction ratio. Further, based on the balance thereof, an offset amount e1 is determined.

As a result, depending on the strength balance between the hypoid gear 4 and the whole, a dimension (size) of a bearing 13 on the motor shaft load side and an axial interval A1 between the bearing 13 and the center C of the hypoid gear 5 are determined.

Figure 16:
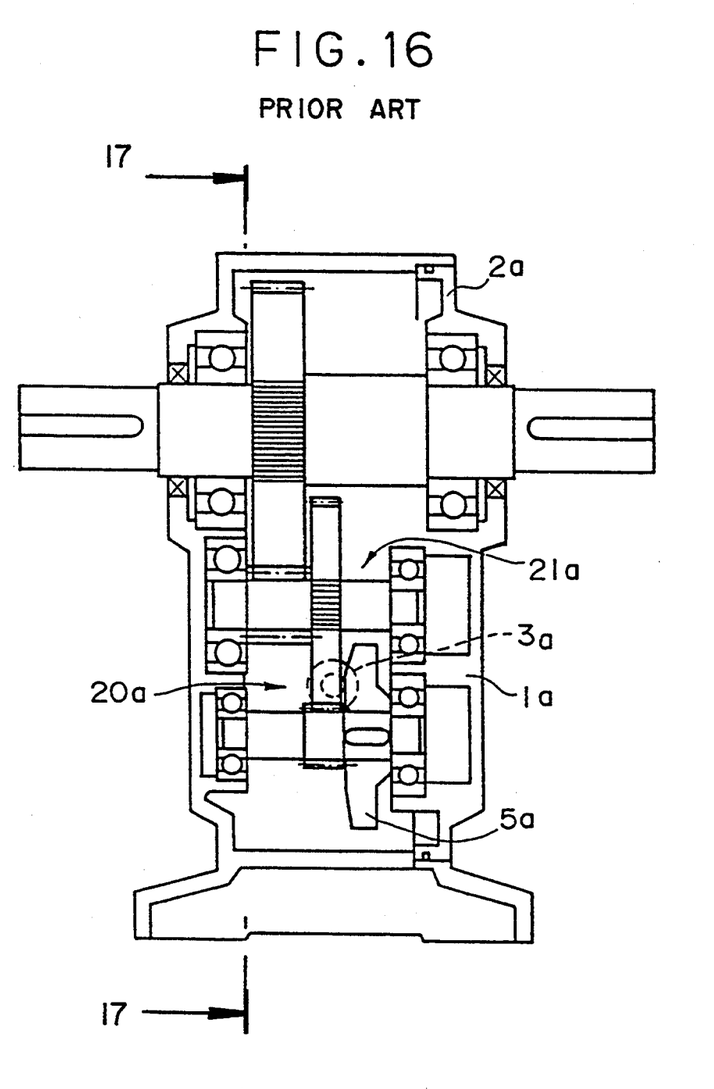
FIG. 16 is a development of a gear train showing the conventional example, wherein a small capacity motor is combined with a high reduction ratio gear box.
Figure 19:
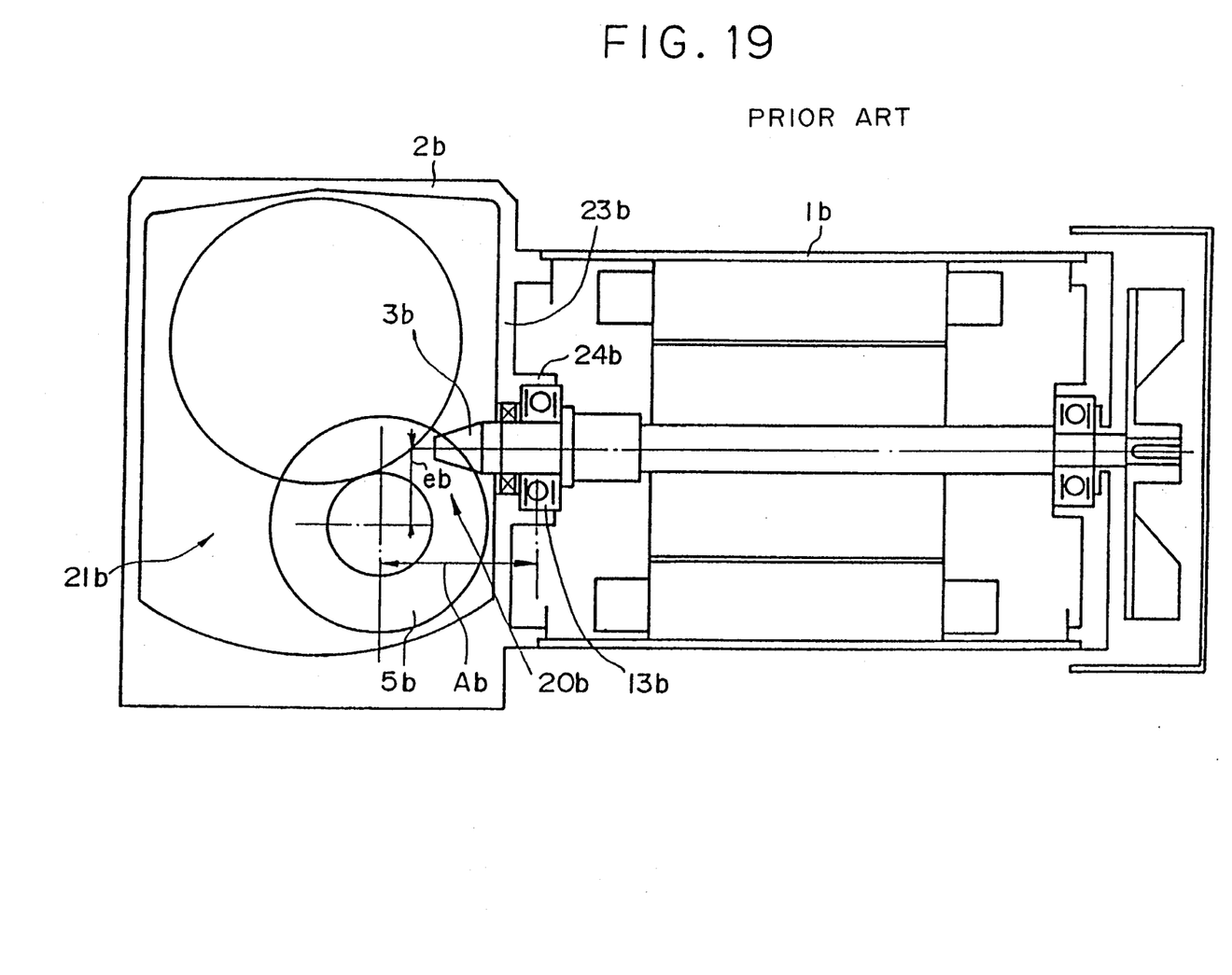
FIG. 19 is an axial sectional view showing the arrangement of the gear train of FIG. 18.

Under the above requirement, in the examples as shown in FIGS. 16 and 19, the following serialization is achieved by combining two kinds or more of the motors in one frame number.

Figure 17:
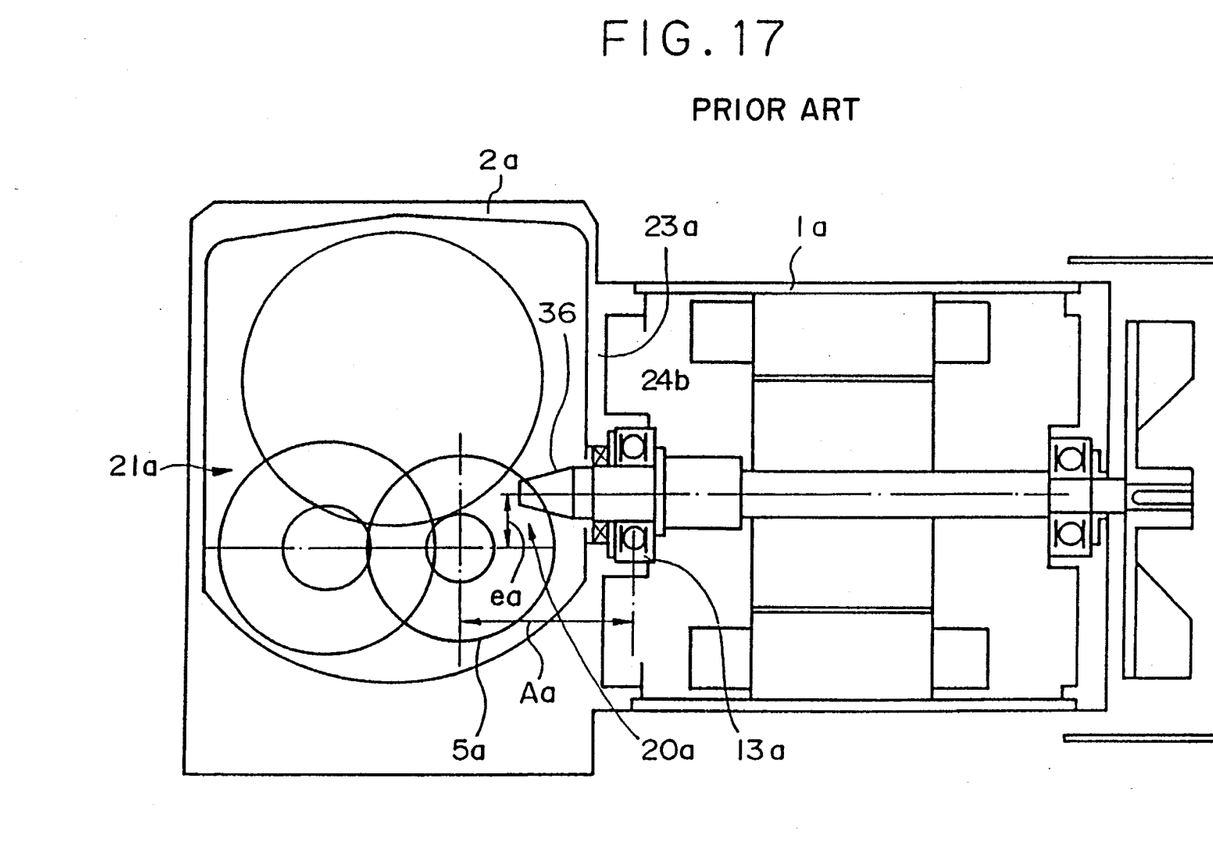
FIG. 17 is an axial sectional view showing the arrangement of the gear train of FIG. 16.

FIG. 16 shows an example of combining a small capacity motor 1a with a high reduction ratio gear box 2a including a hypoid gear set 20a combined with two steps of parallel shaft gears 21a. FIG. 17 shows a development of the gear train thereof.

Figure 18:
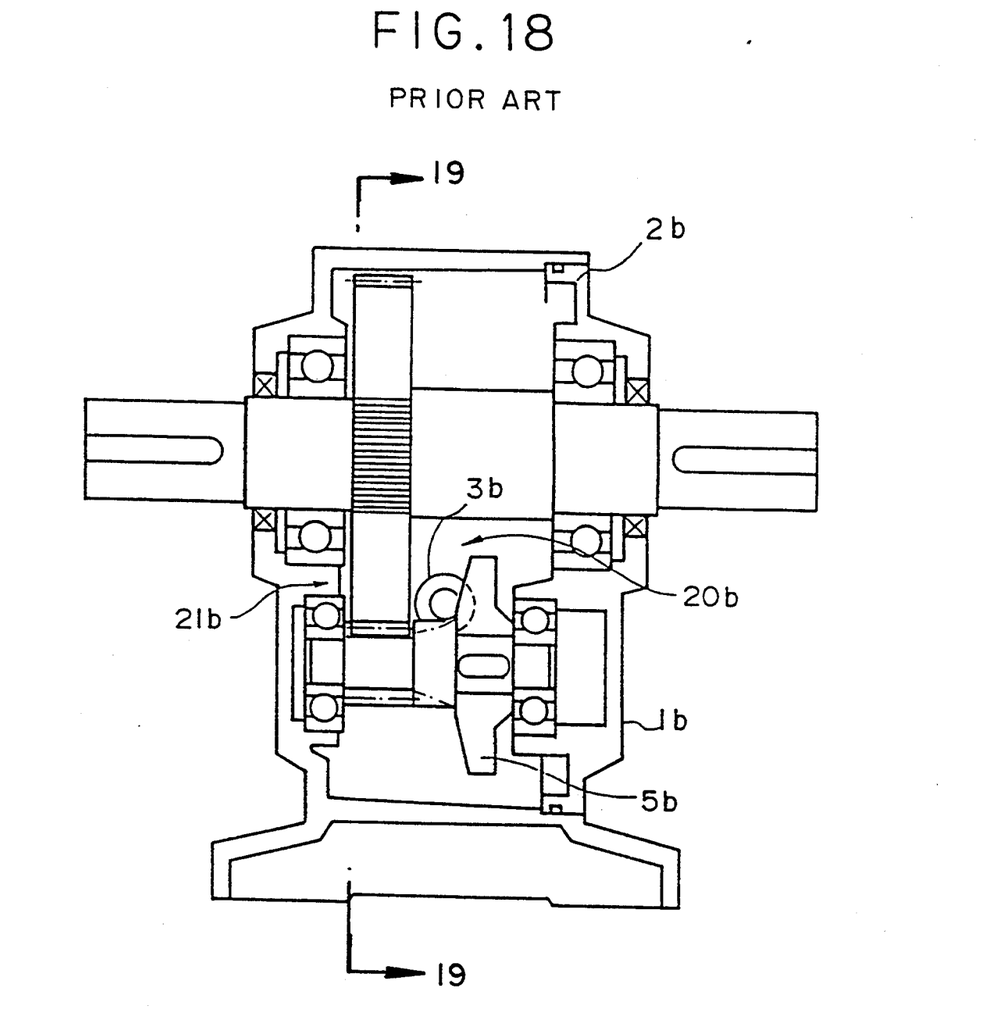
FIG. 18 is a development of a gear train showing the conventional example, wherein a large capacity motor is combined with a low reduction ratio gear box.

FIG. 18 is an example of combining a large capacity motor 1b with a low reduction ratio gear box 2b including a hypoid gear set 20b combined with a one step of parallel shaft gear 21b. FIG. 19 is a development of the gear train thereof.

Each example described above belongs to the same frame number. As shown in FIG. 17 (19), a wall surface 23a (23b) of the motor 1a (1b) on the gear box side is formed integrally with the gear box 2a (2b). A bearing 13a (13b) on the motor shaft load side is contained in a housing 24a (24b) provided on the wall surface 23a (23b).

The hypoid gear sets 20a (20b) having the different sizes are prepared for respective capacities of the motors 1a (1b). The high reduction ratio gear reducer, which is smaller in the motor capacity, is combined with the hypoid gear set 20a with a small size (see FIGS. 16 and 17). On the other hand, the low reduction ratio gear reducer, which is larger in the motor capacity, is combined with the hypoid gear set 20b with a large size (see FIGS. 18 and 19).

Also, while not being shown, as for the motor shafts 3a (3b) integrally formed with the hypoid pinions 4a (4b), the motor shaft for a large capacity belonging to the frame number in the figure may be used for a high reduction ratio in the higher frame number. On the other hand, the motor shaft for a small capacity belonging to the frame number in the figure may be used for a low reduction ratio in the Lower frame number. Thus, in the series, it is possible to number of kinds of the motor shafts 3a(3b).

However, even in the series of the examples as shown in FIGS. 16 to 19, in the same frame number, the gear boxes 2a and 2b differ in the offset amounts $<ea>$ and $<eb>$, the bearings 13a and 13b on the motor shaft load side and in the axial intervals Aa and Ab of the hypoid gears 5a and 5b. As a result, there must be prepared the gear box 2a exclusive for a high reduction ratio (three-step type), and the gear box 2b exclusive for a low reduction ratio (two-step type). Accordingly, the parallel shaft gear trains 21a and 21b cannot be used in common.

That is, even in the conventional series relating to the combination of the gear boxes and the motors as shown in FIGS. 16 to 19, there has been significantly arisen a disadvantage of not sufficiently coping with the diversification and the cost reduction of the orthogonal gear reducers with motors generated by the rationalization of the recent production system.

Concretely, in the physical distribution system frequently using the gear reducers, it is efficient that the required parts of the physical distribution system constituted of a plurality of conveyors are operated when required, and accordingly, the conveyors are intended to be independently driven.

However, the orthogonal gear reducer with a motor used for a conveyor constitutes only part of a mating machine (conveyor or the like), and further, the mating machine constitutes only part of the whole physical distribution system. Accordingly, in the viewpoint of the whole physical distribution system, there are required various mounting (fitting) methods and reduction ratios, for containing the orthogonal gear reducers with motors and for obtaining the optimal output torque and the output rotational frequency.

For example, the orthogonal gear reducers with motors are required in the physical system to be used in the following various mounting methods, various combinations of the motor capacities and various reduction ratios. The above mounting methods involve: a) a foot mounting type of fitting the gear reducer to the mating machine at the floor surface parallel to the output shaft of the gear box; b) a flange mounting type of fitting the gear reducer to the mating machine at the surface right to the output shaft of the gear box; and c) a hollow-shaft type of making the output shaft of the gear box to be hollowed, and passing the gear box through the hollow portion, thereby directly connecting the gear reducer to the input shaft of the mating machine.

However, in the series according to the conventional combination of gear box and motor, there has arisen a disadvantage of requiring the kinds of the gear boxes corresponding to those of the combination of the motor capacities in the same frame number.

In general, the gear box occupies a large capacity in the whole orthogonal gear reducer and is large in weight, and further, requires a large number of the machining processes. Accordingly, increase in the kinds of the gear boxes to be prepared as stock directly leads to cost rise.

Also, in the viewpoint of the whole physical distribution system, the orthogonal gear reducers with motors are often required to be changed in the reduction ratio and motor capacity. However, in the conventional series, the change in the motor capacity necessarily needs the change in the gear box, and consequently, the whole gear reducer must be exchanged. This results in the useless spending to users.

SUMMARY OF THE INVENTION

Taking the above circumstances into consideration, the present invention has been made. Accordingly, an object of the present invention is to provide a series of orthogonal gear reducing with motors capable of reducing the number of motors and gear boxes to needed by using them in common as much as possible while coping with the various fitting methods and the combinations of the reduction ratios and the load capacities required along with the diversification of the physical distribution system, thereby reducing the cost. Another object of the present invention is to provide a series of orthogonal gear reducers with motors, wherein even in the case that an orthogonal gear reducer with a motor assembled in the physical distribution system is required to be changed in the motor capacity and the reduction ratio, there can be eliminated the need of exchanging the whole reducer, thereby improving the rationalization.

In a preferred mode of the present invention, there is provided a series of orthogonal gear reducers with motors, each comprising a motor and a gear box having an output shaft disposed to be orthogonal to the motor, wherein the gear box at least contains a hypoid gear set including a hypoid pinion formed on the shaft of the motor, and a hypoid gear mounted on a shaft disposed to be eccentrically orthogonal to the motor shaft.

In the above, the series is constituted of the collection of sub-series, in each of which gear reducers have the same fitting dimensions required to be mounted on mating machines while being different in the reduction ratio extending from a low reduction ratio range to a high reduction ratio range.

Also, a cover of the motor on the side of the gear box is provided separately from the gear box for making the motor separable from the gear box.

Further, the positioning between the separable motor cover and the gear box Is performed by spigot-joining the motor cover to the mounting surface of the gear box.

Still further, the following requirements are satisfied in the same sub-series:
① the fitting dimensions between the motor cover and the gear boxes, while including the dimension of the spigot-joining portion, are made constant;

(2) the axial shifted amount between the hypoid gear and the hypoid pinion is made constant;

(3) an outside diameter of the hypoid gear is made almost constant; and (4) a distance between the center of the hypoid gear, and the mounting surface for the motor cover and the gear box is made constant.

With this construction, it is possible to keep the required strength level of the hypoid gear set to be almost constant and to combine two kinds or more of the motors one of the gear box by combining the hypoid pinion constituting the hypoid gear set having a low reduction ratio with a large capacity motor, and also combining the hypoid pinion constituting the hypoid gear set having a high reduction ratio to a small capacity motor.

Figure 1:
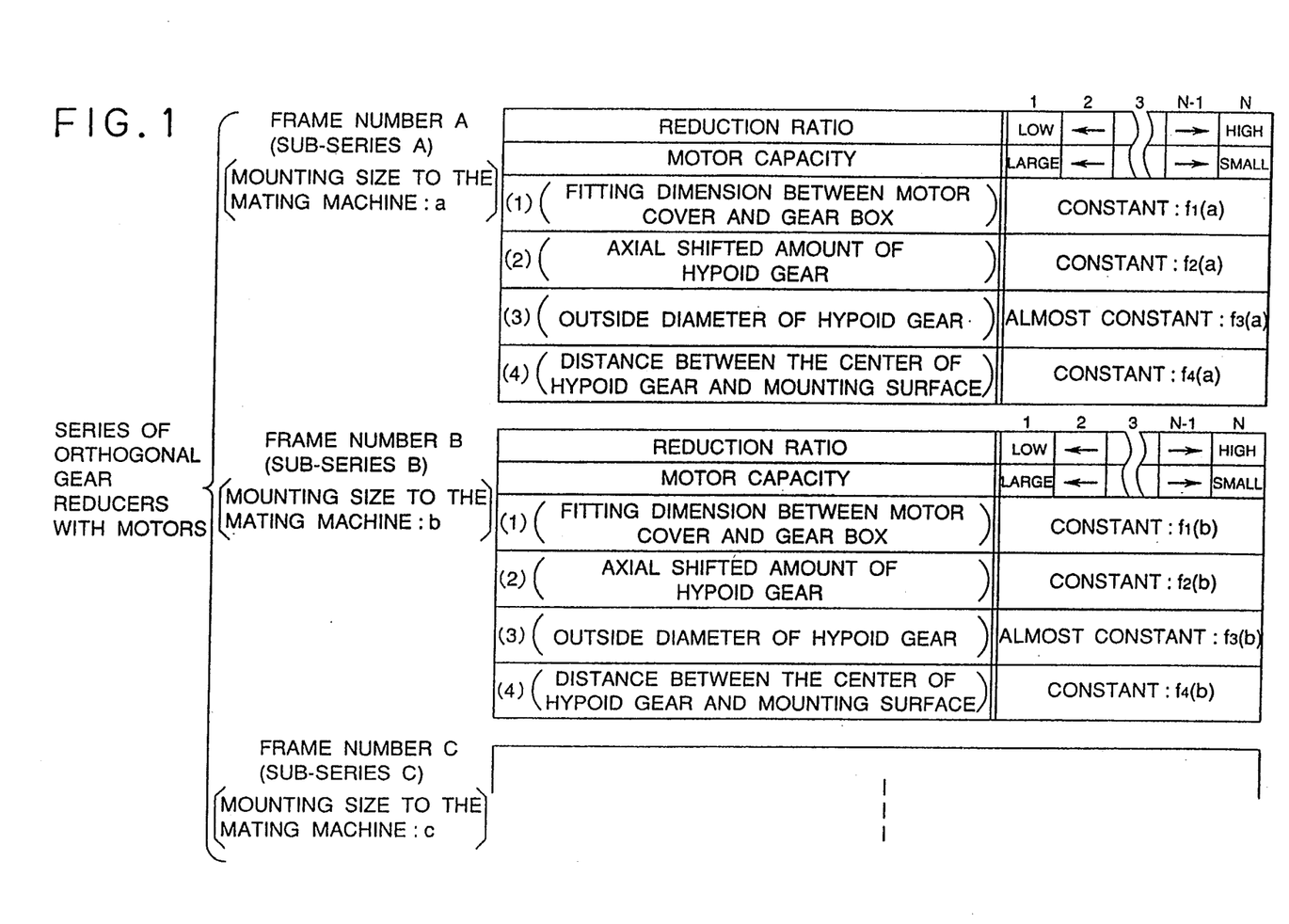
FIG. 1 is a diagram showing the gist of a series of orthogonal gear reducers with motors according to the present invention.

The series according to the present invention is illustrated in FIG. 1.

Thus, according to the present invention, one gear box can correspond to the combination of the two kinds or more of the motors. Further, in this case, it is possible to keep the strength level of the hypoid gear set to be constant irrespective of the motor capacity.

Also, since each hypoid gear set has a different reduction ratio, the gear train of the parallel shaft gear parts generally assembled with the hypoid gear set can be used in common, to thereby realize the cost reduction.

That is, for example, if the gear box contains a reducing means besides the hypoid gear set, the reducing means is used in common, the hypoid gear set is changed in the reduction ratio thereof to change the total reduction ratio of the gear box as a whole, then, it is possible to further promote the common use.

Further, if there is provided a series group consisting of two kinds or more of above series, each series has own gear boxes being mounted to mating machines by own mounting methods respectively, wherein the combinations of motors and gear boxes in each sub-series (frame number) of two kinds or more of the series are unified, then, in the same combination of a motor and a gear box, a gear box in an arbitrary series can be selected among gear boxes in two kinds or more of the series.

Namely, by preparing the series for each gear box different in the mounting method, and unifying the combination of the motor and the gear box in each frame number, it is possible to use the motor in common even to the gear boxes different in the mounting method, in the case of the same combination of the motor and the gear box.

BRIEF DESCRIPTION OF THE DRAWINGS

The above and other objects, features and advantages of the present invention will be more apparent from the following description of the invention taken in conjunction with the accompanying drawings, wherein like reference characters designate the same or similar parts, and wherein.

DESCRIPTION OF THE PREFERRED EMBODIMENT

Hereinafter, embodiments of the present invention will be explained with reference to the accompanying drawings.

The present invention is effectively embodied in the series that gear boxes are mounted to mating machines by various mounting methods; however, it can be embodied in the series that gear boxes are mounted by a single mounting method. This embodiment will be typically explained by way of the series having the flange mounting type gear boxes as shown in FIGS. 2, 3, 14 and 15.

In addition, as explained above, the orthogonal gear reducer itself with a motor as shown in FIGS. 14 and 15 is already known.

First, in the present invention, a series of the orthogonal gear reducers with motors is basically constituted of the collection of the sub series (frame numbers), wherein the gear reducers, while being different in the reduction ratio from each other, have the same fitting dimensions (sizes) to be mounted to the mating machines.

Figure 2:
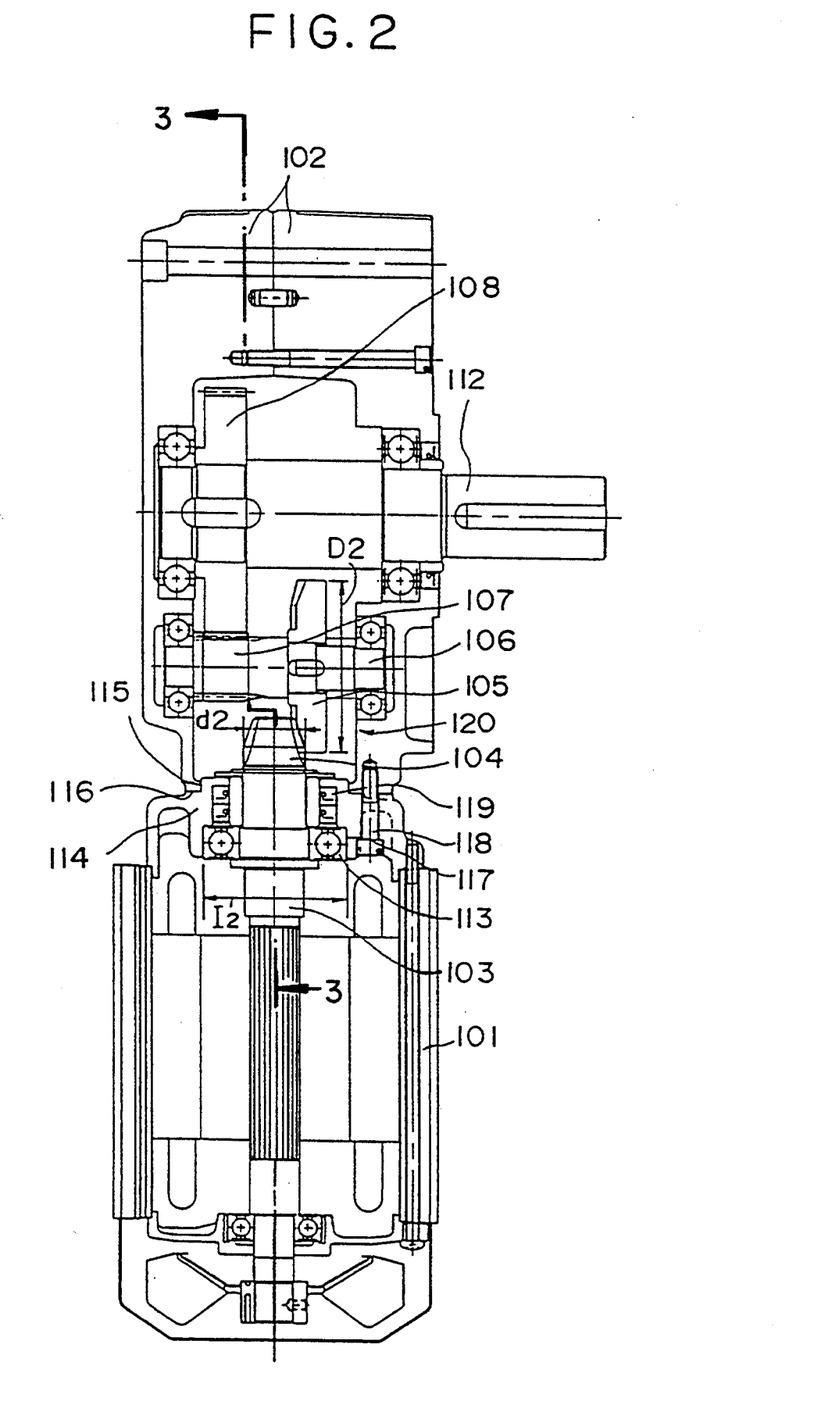
FIG. 2 is a development of a gear train of an orthogonal gear reducer with a motor showing an embodiment of applying the present invention to the flange mounting type gear box.
Figure 3:
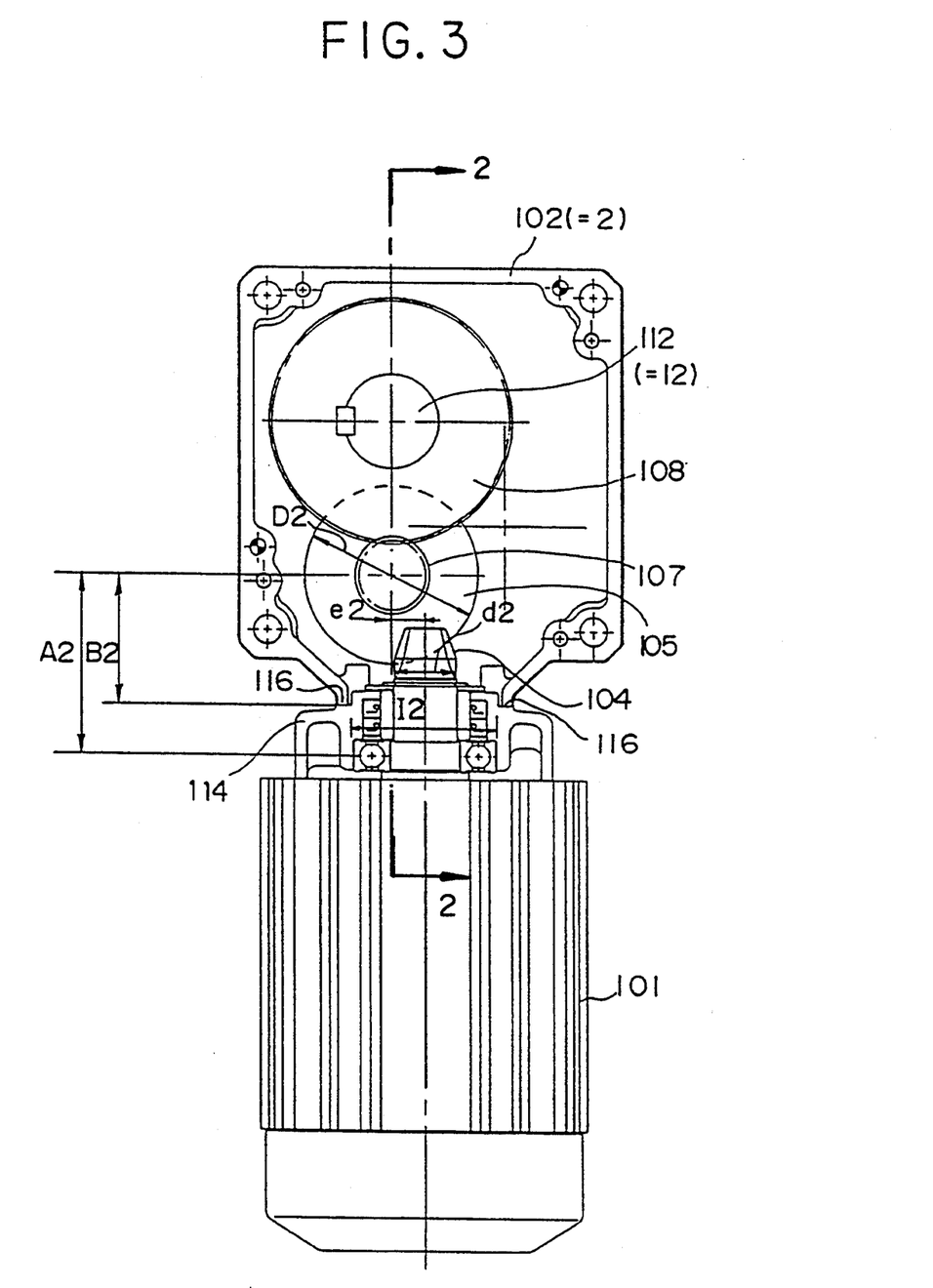
FIG. 3 is an axial sectional view showing the arrangement of the gear train of FIG. 1.

The orthogonal gear reducers with motors as shown in FIGS. 2 and 3, and in FIGS. 14 and 15 belong to the same frame number, respectively.

In the series of the present invention, the reducer as shown in FIGS. 14 and 15 corresponds to an embodiment having the combination of a small capacity motor with a high reduction ratio gear box.

More specifically, in this embodiment, a small capacity motor 1 is combined with a three-step type high reduction ratio gear box 2 constituted of a hypoid gear 20 having a high reduction ratio of 10 and two steps of parallel shaft gear trains 21, to thereby realize the high reduction ratio with a small power.

In addition, FIG. 15 is an axial sectional view of FIG. 14.

In FIGS. 14 and 15, a cover (motor cover) 14 of the motor 1 on the gear reducer side is constructed to be separated from a gear box 2. The motor cover 14 contains a bearing 13 on the motor shaft load side through a bearing housing 17, and prevents the leak of the lubricant from the gear box 2 by an oil seal 19. With this construction, the motor 1 is separable from the gear box 2.

On the other hand, a motor shaft 3 of the motor 1 having the leading edge integrally formed with a hypoid pinion 4. The positioning between the motor 1 and the gear box 2 is performed by spigot-joining the motor 1 with the mounting surface 16 of the gear box 2, and is rigidly held by bolts 18.

In this figure, numeral 6 is a second-step intermediate shaft; 7 is a second-step pinion; 8 is a second-step gear; 9 is a third-step intermediate shaft; 10 is a third-step pinion; 11 is a third-step gear; 12 is an output shaft; 15 is a spigot-joint portion.

On the contrary, in the series of the present invention, the reducer as shown in FIGS. 2 and 3 corresponds to another embodiment, wherein a large capacity motor 101 is combined with a two-step type low reduction ratio gear box 102 constituted of a hypoid gear set 120 having a low reduction ratio of 5 and a one step of parallel shaft gear train 121, to thus realize the low reduction ratio with a large power.

FIG. 3 is an axial sectional view showing an arrangement of the gear train of FIG. 2.

In FIGS. 2 and 3, the same or similar parts as in FIGS. 14 and 15 are designated by the like reference characters in the two figures.

The feature of the construction in the series according to the present invention will be explained by comparing the gear reducer as shown in FIGS. 2 and 3 with the gear reducer as shown in FIGS. 14 and 15

① The fitting dimensions (sizes) between the motor cover 14 (114) and the gear box 2 (102), (for example, the diameter and depth of the spigot portion 15 (115), and the pitch of a bolt 18), are made constant, that is, the diameter of the spigot-portion I1=I2 (see FIGS. 2 and 14).

② An axial shifted amount or offset amount e1 (e2) between the hypoid pinion 4 (104) formed on the motor shaft 3 (103) and the hypoid gear 5 (105) is made constant, that is, e1=e2 (see FIGS. 3 and 15).

③ An outside diameter D1 (D2) of the hypoid gear 5 (105) is almost made constant (see FIGS. 2 and 14).

④ A distance B1 (B2) between the center C of the hypoid gear 5 (105), and the mounting surface 16 (116) for the motor cover 14 (114) and the gear box 2 (102) is made constant, that is, B1=B2 (see FIGS. 3 and 15).

Under the above requirements ① to ④, the hypoid pinion 104, constituting the hypoid gear set 120 having a low reduction ratio of 5, can correspond to the large capacity motor 101. Further, the hypoid pinion 4, constituting the hypoid gear set 20 having a high reduction ratio of 10, can correspond to the small capacity motor 1.

Further, under the above requirements ① to ④, the pitch diameter of the hypoid pinion 104 formed integrally with a large capacity motor 101 is liable to be necessarily made larger, and the pitch diameter of the hypoid pinion 4 formed integrally with a small capacity motor 1 is liable to be necessarily made smaller. Accordingly, preferably, the strength level (for example, contact stress of tooth) of each hypoid gear set can be almost equally secured.

In addition, a large outside diameter d2 of the hypoid pinion 104 corresponds to the large capacity motor 101. Also, a small outside diameter d1 of the hypoid pinion 4 corresponds to a small capacity motor 1. However, since the reduction ratio is liable to be low for the large capacity motor 101, and to be high for the small capacity motor 1, it is possible to make almost constant the outline D1 (D2) of the hypoid gear 5 (105).

The distance A1 (A2) between the center C of the hypoid gear 5 (105) and the bearing 13 (113) on the motor load side is larger for the large capacity motor 101, and smaller for the small capacity motor 1. However, since the motor cover 14 (114) is formed separately from the gear box 2 (102), it is possible to make constant the distance B1 (B2) between the hypoid gear 5 (105) and the mounting surface 16 (116) by adjusting the size of the motor cover (114).

Thus, it is possible to combine two kinds or more of motors 1 and 101 different in the dimension and the capacity with one gear box 2 (102) (the gear boxes 2 and 102 are identical with each other) while keeping the required strength level. Further, it is possible to use in common the parallel shaft gear trains 21 (121) in its first step.

The gear box 2 (102) has a housing for holding the bearing for a third-step intermediate shaft 109, to contain either two-step type or three-step type of the gear train including the hypoid gear set 20 (120). In using the two-step type gear train, the intermediate shaft 109 is not used.

In addition, in this embodiment, for example, by taking the reduction ratio of the hypoid gear set 20 for a small capacity motor 1 as 10, and the reduction ratio of the hypoid gear set 120 for a large capacity motor 101 as 5, in the case of using such a parallel gear train as obtaining the total reduction ratio of 80, 100 and 120, it is possible to obtain the total reduction ratio of 40, 50 and 60 by the combination of the parallel gear train with the large capacity motor.

Incidentally, in the present invention, there may be prepared another series of the orthogonal gear reducers with motors using the gear boxes different in the mounting methods (foot mounting type, flange mounting type, and hollow-shaft type and the like described above). Further, each series is constituted of the frame number group, and the combination of the motor and the reduction ratio for each frame number is unified irrespective of the mounting methods. With this arrangement, the present invention is made further effective.

Another embodiment based on this thought will be shown in FIG. 4 to 13.

Figure 4:
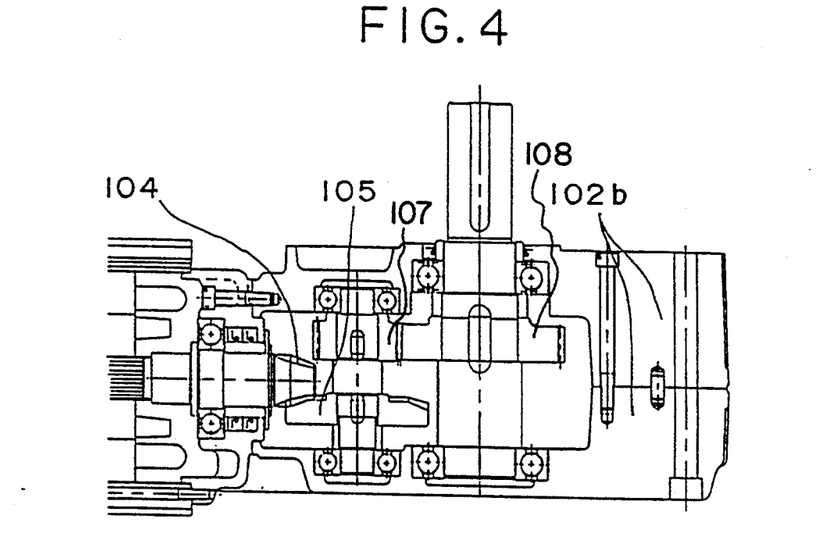
FIG. 4 is a development showing an embodiment, wherein the outputting direction of the output shaft in the flange-mounting type is situated on the side opposed to the case in FIG. 2.
Figure 5:
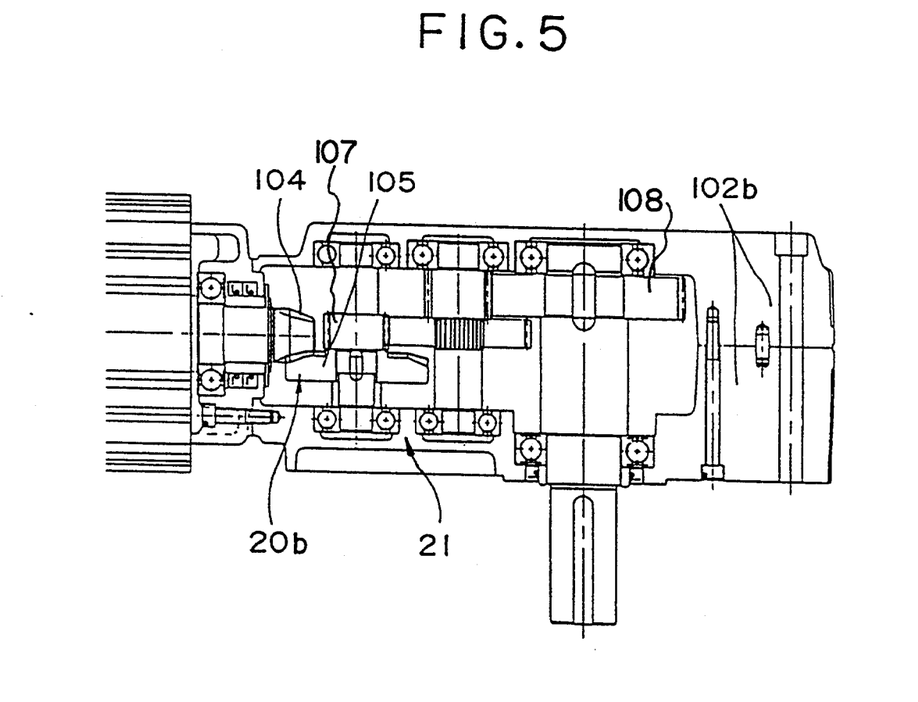
FIG. 5 is a development showing an embodiment, wherein a parallel shaft gear of a reducer shown in FIG. 14 is left as it is, and a hypoid gear set is exchanged to that having a large capacity and low reduction ratio.

FIG. 4 shows an example, wherein the embodiment of FIG. 2 is applied to another gear box 102b different in the output direction of the output shaft, and the hypoid gear with a large capacity and a low reduction ratio is used. FIG. 5 shows an example, wherein the parallel gear train 21 combined with the hypoid gear set 20 with a small capacity and a high reduction ratio is left as it is, and the hypoid gear set 20b is exchanged to that with a large capacity and a low reduction ratio, thereby changing the total reduction ratio and the output torque.

Figure 6:
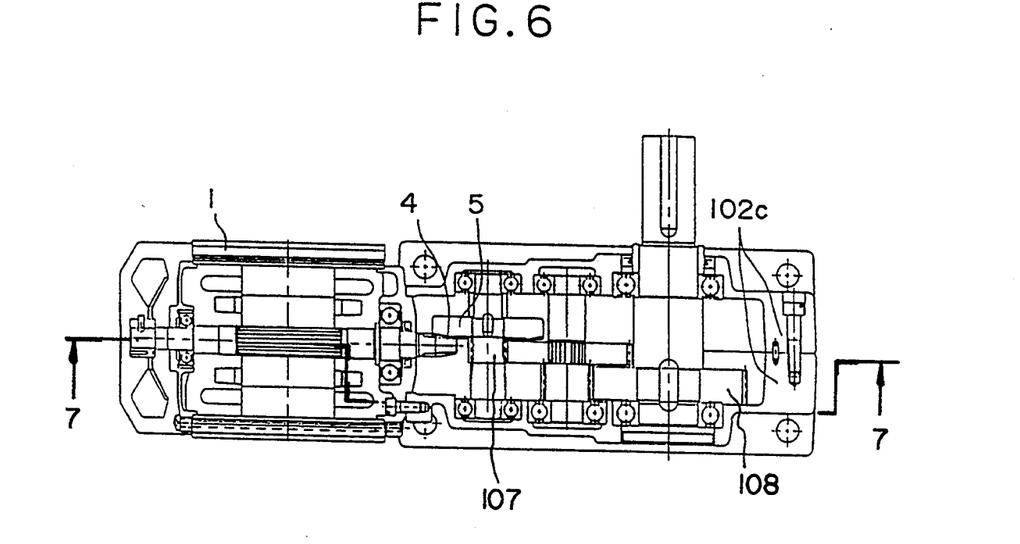
FIG. 6 is a development of a gear train of an embodiment, wherein the present invention is applied to a gear box of afoot mounting type and a small capacity motor is combined with a large reduction ratio gear box.
Figure 7:
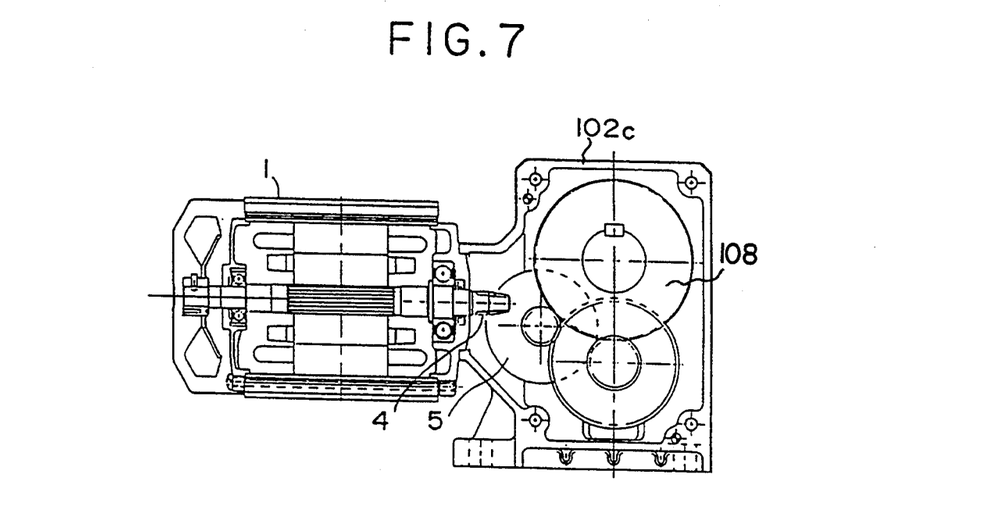
FIG. 7 is an axial sectional view showing the arrangement of the gear train of FIG. 6.

FIG. 6 shows an example, wherein the present invention is applied to the gear box 102c of a foot mounting type and a small capacity motor 1 is combined with a large reduction ratio gear box 102c. FIG. 7 is an axial sectional view showing the arrangement of the gear train of FIG. 6.

Figure 8:
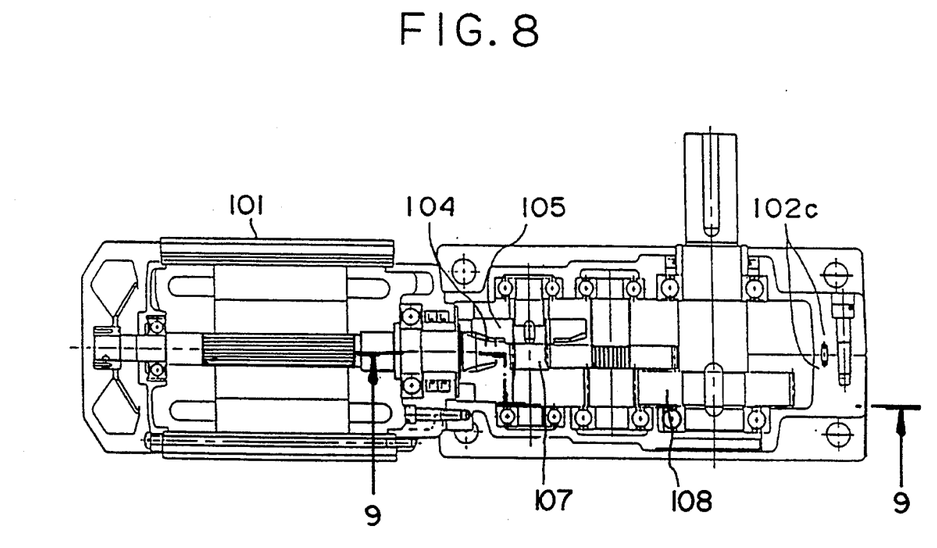
FIG. 8 is a development of the gear train, wherein a large capacity motor is applied to the gear box of the foot mounting type of FIG. 6.
Figure 9:
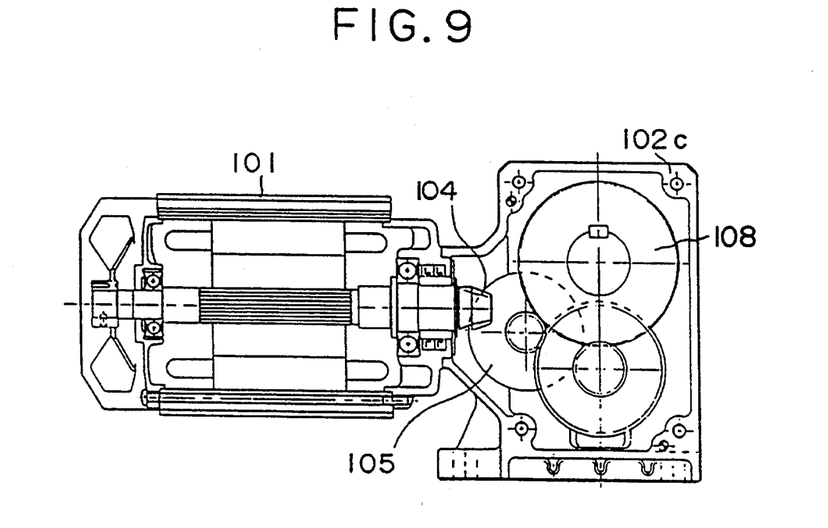
FIG. 9 is an axial sectional view showing the arrangement of the gear train of FIG. 8.

FIG. 8 is a development of an embodiment of combining a large capacity motor 101 with the gear box 102c of a foot mounting type. FIG. 9 is an axial sectional view showing an arrangement of the gear train of FIG. 8.

Figure 10:
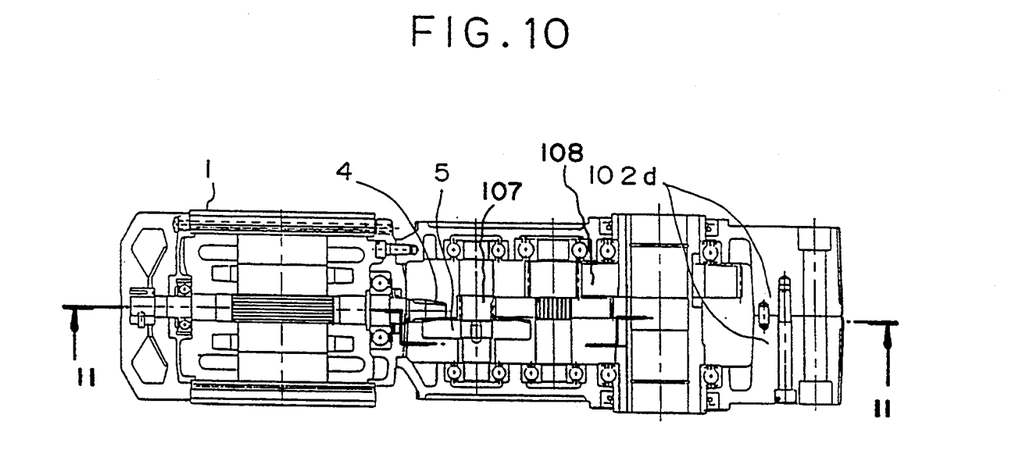
FIG. 10 is a development of the gear train of an embodiment, wherein the present invention is applied to a hollow-shaft type gear box, and a small capacity motor is combined with a large reduction ratio gear box.
Figure 11:
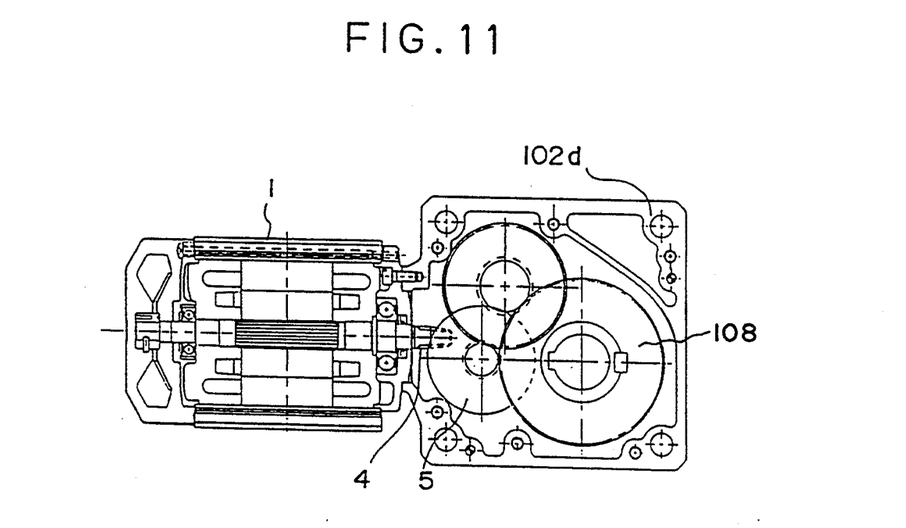
FIG. 11 is an axial sectional view showing the arrangement of the gear train of FIG. 10.

FIG. 10 is a development of an embodiment of combining a small capacity motor 1 with the high reduction ratio gear train wherein the present invention is applied to the hollow shaft type gear box 102d. FIG. 11 is an axial sectional view showing an arrangement of the gear train of FIG. 10.

Figure 12:
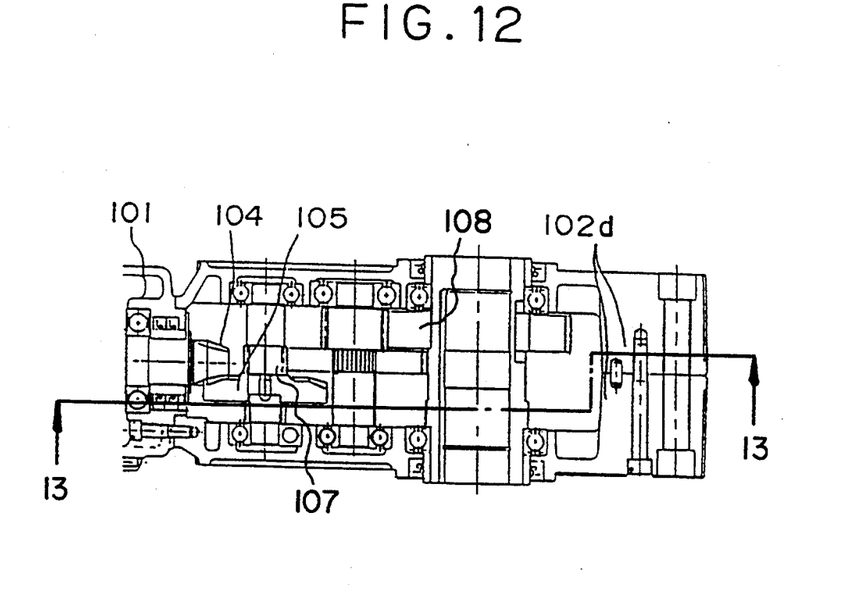
FIG. 12 is a development showing an embodiment of a gear train, wherein a large capacity motor is applied to a hollow-shaft gear box.
Figure 13:
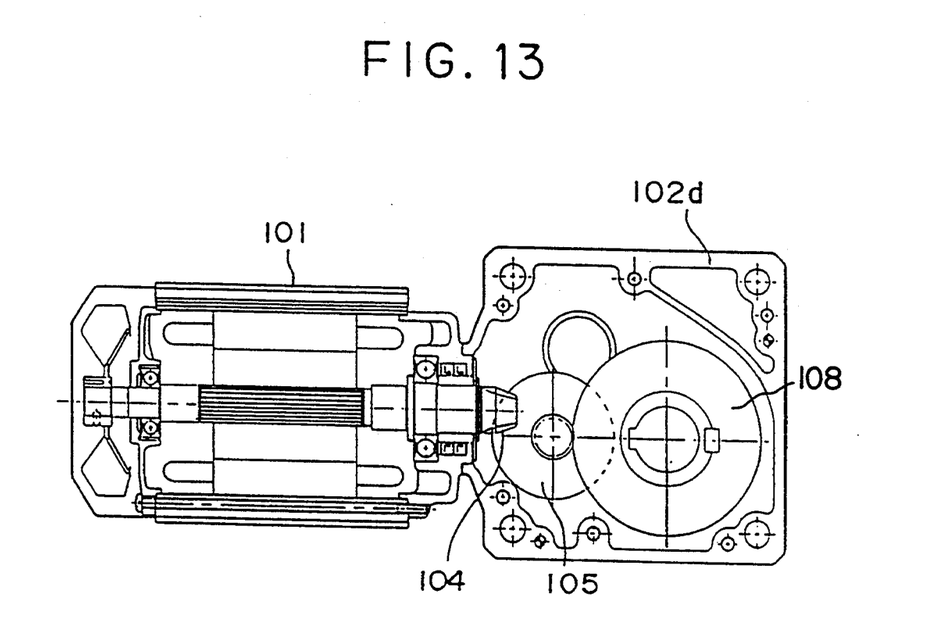
FIG. 13 is an axial sectional view showing the arrangement of the gear train of FIG. 12.

Further, FIG. 12 is a development of the gear train wherein a large capacity motor 101 is applied to the gear box 102d of a hollow-shaft type as shown in FIG. 10. FIG. 13 is an axial sectional view showing an arrangement of the gear train of FIG. 12.

Thus, even in the series of the reducers different in the mounting methods, it is preferable to unify the combination of the motors and the reduction ratios in each frame number of each series. With this construction, in the case of the same combination of the motor and the reduction ratio, the gear box of an arbitrary series (gear box of an arbitrary mounting method) can be selected among two kinds or more of the series. Thus, the effect of the present invention can be achieved to be maximum. In other words, it is possible to use in common the motors to be combined with the gear boxes different in the mounting method.

What is claimed is:

1. A series of orthogonal gear reducers with motors, said series is constituted of a collection of subseries, in each of which the gear reducers have the same fitting dimensions required to be mounted on mating machines while being different in reduction ratios extending from a low reduction ratio to a high reduction ratio, each of said subseries comprising:
   a motor with a shaft and a gear box side;
   a gear box with an output shaft disposed orthogonally to said motor;
   wherein said gear box comprises a hypoid gear set comprising a hypoid pinion, with a reduction ratio, formed on said shaft of said motor, and a hypoid gear mounted on a hypoid gear set shaft disposed eccentrically orthogonal to said shaft;
   wherein an axial shift distance between said hypoid gear and said pinion is substantially constant in all of said orthogonal gear reducers with motors;
   wherein an outside diameter of said hypoid gear is substantially constant in all of said orthogonal gear reducers with motors;
   a cover of said motor, disposed on said gear box side of said motor between said motor and said gear box, for making said motor separable from said gear box;
   wherein a distance between a center of said hypoid gear and the mounting surface between said cover and said gear box is substantially constant in all of said orthogonal gear reducers with motors;
   wherein a fitting dimension between said cover and said gear box is substantially constant in all of said orthogonal gear reducers with motors; and
   wherein said hypoid gear reduction ratio is such that the required strength level of said hypoid gear is almost constant.

2. A series of orthogonal gear reducers with motors, according to claim 1, wherein said gear box comprises a reducing means for common use and to change the hypoid gear set reduction ratio so as to change the total reduction ratio of said gear box as a whole.

3. A series of orthogonal gear reducers with motors, according to claim 1, which further comprises two kinds or more of gear boxes mounted to said motor by different mounting methods respectively,
   wherein the combinations of motors and gear boxes in each subseries, a gear box in an arbitrary series can be selected among gear boxes in two kinds or more of said series.

4. A series of orthogonal gear reducers with motors comprising:
   at least two subseries, a first and second subseries, each comprising a gear boxes and a motor, wherein said first gear box is of a first type and said second gear box is of a second type which is different from said first type, such that a gear box in an arbitrary subseries can be selected from gear boxes of two kinds or more in said series;
   wherein each of said subseries comprises:
   said motor with a shaft and a gear box side;
   said gear box with an output shaft disposed orthogonally to said motor;
   wherein said gear box comprises a hypoid gear set comprising a hypoid pinion, with a reduction ratio, formed on said shaft of said motor, and a hypoid gear mounted on a hypoid gear set shaft disposed eccentrically orthogonal to said motor shaft;
   wherein an axial shift distance between said hypoid gear and said pinion is substantially constant in all of said orthogonal gear reducers with motors;
   wherein an outside diameter of said hypoid gear is substantially constant in all of said orthogonal gear reducers with motors;
   a cover of said motor, disposed on said gear box side of said motor between said motor and said gear box, for making said motor separable from said gear box;
   wherein a distance between a center of said hypoid gear and the mounting surface between said cover and said gear box is substantially constant in all of said orthogonal gear reducers with motors; and
   wherein a fitting dimension between said cover and said gear box is substantially constant in all of said orthogonal gear reducers with motors; and
   wherein said hypoid gear reduction ratio is such that the required strength level of said hypoid gear is almost constant.

* * * * *